United States Patent
Bao et al.

(10) Patent No.: US 12,335,995 B2
(45) Date of Patent: Jun. 17, 2025

(54) METHOD FOR SELECTING UPLINK TRANSMISSION RESOURCE AND TERMINAL

(71) Applicant: VIVO MOBILE COMMUNICATION CO., LTD., Guangdong (CN)

(72) Inventors: Wei Bao, Guangdong (CN); Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 382 days.

(21) Appl. No.: 17/828,429

(22) Filed: May 31, 2022

(65) Prior Publication Data

US 2022/0295508 A1    Sep. 15, 2022

Related U.S. Application Data

(63) Continuation of application No. PCT/CN2020/133515, filed on Dec. 3, 2020.

(30) Foreign Application Priority Data

Dec. 5, 2019 (CN) .......................... 201911236410.5

(51) Int. Cl.
 *H04W 72/56* (2023.01)
 *H04W 72/0453* (2023.01)
 *H04W 72/21* (2023.01)

(52) U.S. Cl.
 CPC ....... *H04W 72/56* (2023.01); *H04W 72/0453* (2013.01); *H04W 72/21* (2023.01)

(58) Field of Classification Search
 CPC .. H04W 72/56; H04W 72/0453; H04W 72/21
 See application file for complete search history.

(56) References Cited

U.S. PATENT DOCUMENTS

2014/0369324 A1    12/2014 Lin et al.
2016/0044606 A1    2/2016  Yin
(Continued)

FOREIGN PATENT DOCUMENTS

CN    106134261 A    11/2016
CN    109392015 A    2/2019
(Continued)

OTHER PUBLICATIONS

Yang W. et al., WO-2014015811-A1, 2014 (Year: 2014).*

(Continued)

*Primary Examiner* — Peter Chen
*Assistant Examiner* — Jia Hao Deng
(74) *Attorney, Agent, or Firm* — Price Heneveld LLP

(57) ABSTRACT

A method for selecting an uplink transmission resource and a terminal are provided. The method includes: selecting at least two PUSCH resources on M carriers for uplink transmission if a priority of at least one PUSCH resource on the M carriers is higher than or equal to priorities of PUCCH resources on N carriers; otherwise, selecting at least one PUCCH resource on the N carriers for uplink transmission; where each of the PUSCH resources on the M carriers collides with each PUCCH resources on the N carriers, the M carriers and the N carriers belong to a same cell group, M and N are natural numbers, M is greater than 1, and N is greater than or equal to 1.

15 Claims, 3 Drawing Sheets

(56) References Cited

U.S. PATENT DOCUMENTS

| | | |
|---|---|---|
| 2017/0347271 A1 | 11/2017 | Baldemair et al. |
| 2018/0167933 A1 | 6/2018 | Yin et al. |
| 2019/0230683 A1 | 7/2019 | Akkarakaran et al. |
| 2019/0320431 A1 | 10/2019 | Huang et al. |
| 2019/0342895 A1 | 11/2019 | Loehr et al. |
| 2019/0349061 A1 | 11/2019 | Cirik et al. |
| 2021/0144700 A1 | 5/2021 | Lee et al. |

FOREIGN PATENT DOCUMENTS

| | | | | |
|---|---|---|---|---|
| CN | 110139384 A | 8/2019 | | |
| CN | 110351757 A | 10/2019 | | |
| CN | 110383912 A | 10/2019 | | |
| EP | 2445132 A1 | 4/2012 | | |
| EP | 3100533 | 12/2016 | | |
| EP | 3100533 B1 | 3/2021 | | |
| RU | 2684199 C1 | 4/2019 | | |
| WO | WO-2014015811 A1 * | 1/2014 | ........... | H04L 1/0028 |
| WO | 2015115851 A1 | 8/2015 | | |
| WO | 2018208087 A1 | 11/2018 | | |

OTHER PUBLICATIONS

Samsung, "Report of [Offline-036][IIOT] Data Data and Data SR prioritization", 3GPP TSG-RAN2 Meeting #109-e, R2-2002190, Feb. 24-Mar. 6, 2020.

Vivo, "Intra-UE prioritization with CA", 3GPP TSG-RAN WG2 Meeting #109-e, R2-2000496, Electronic Meeting, Feb. 24-Mar. 6, 2020.

Vivo, "Remaining issues for SR and PUSCH collision", 3GPP TSG-RAN WG2 Meeting #108, R2-1914968 (Revision of R2-1912322), Reno, USA, Nov. 18-22, 2019.

Interdigital, "Intra UE prioritization between SR and PUSCH", 3GPP RAN WG2 Meeting #108, R2-1914880, Reno, U.S.A, Nov. 18-22, 2019.

Ericsson, "Intra-UE control-data prioritization—SR over PUSCH", 3GPP TSG-RAN WG2 #108, Tdoc R2-1914759 (revision of R2-1912557), Reno, U.S., Nov. 18-22, 2019.

Ericsson, "Main functions of intra-UE data-data prioritization", 3GPP TSG-RAN WG2 #108, Tdoc R2-1914758 (Revision of R2-1912555), Reno, Nevada, US, Nov. 18-22, 2019.

CATT, "Equal-priority Handling", 3GPP TSG-RAN WG2 Meeting #108, R2-1914414 (Revision of R2-1912212), Reno, USA, Nov. 18-22, 2019.

Fujitsu, "Remaining issues for power control priority rules in dual connectivity", 3GPP TSG RAN WG1 Meeting #78bis, R1-143836, Ljubljana, Slovenia, Oct. 6-10, 2014.

ZTE Corporation, "Discussion on prioritization for transmission power scaling for DC", 3GPP TSG RAN WG1 Meeting #96bis, R1-1904760, Xi'an, China, Apr. 8-12, 2019.

* cited by examiner

METHOD FOR SELECTING UPLINK TRANSMISSION RESOURCE AND TERMINAL

CROSS-REFERENCE TO RELATED APPLICATIONS

This application is a continuation application of International Application No. PCT/CN2020/133515 filed on Dec. 3, 2020, which claims priority to Chinese Patent Application No. 201911236410.5, filed in China on Dec. 5, 2019, which are incorporated herein by reference in their entireties.

TECHNICAL FIELD

Embodiments of the present invention relate to the field of communications technologies, and specifically, to a method for selecting an uplink transmission resource and a terminal.

BACKGROUND

In long term evolution (LTE) and new radio (NR), a terminal (for example, user equipment (UE)) can use two types of channels for uplink data transmission: a physical uplink shared channel (PUSCH) and a physical uplink control channel PUCCH).

For example, if the UE is configured with carrier aggregation (CA), the UE is allocated with PUSCHs and PUCCHs respectively on a plurality of carriers of a same cell group, and temporal locations of the PUSCHs and PUCCHs completely or partially overlap. Limited by UE capabilities, some UEs cannot simultaneously transmit signals on PUSCH and PUCCH resources; and some other UEs cannot simultaneously use PUSCH and PUCCH resources on a same cell to transmit signals. Currently, the UE selects the uplink resources based on their priorities. It is assumed that a priority order of conflicting resources is as follows:
PUSCH@Cell1>PUCCH@Cell1>PUSCH@Cell2.

If the UE first compares priorities of the PUCCH@Cell1 and the PUSCH@Cell2, the PUCCH@Cell1 has a higher priority than the PUSCH@Cell2, so that the PUSCH@Cell2 cannot be used for transmission; then compares the priorities of the PUSCH@Cell1 and the PUCCH@Cell1, the PUSCH@Cell1 has a higher priority than the PUCCH@Cell1, so that the PUCCH@Cell1 cannot be used for transmission; and finally, the UE only performs uplink transmission on the PUSCH@Cell1, thereby leading to waste of resources.

SUMMARY

An objective of embodiments of the present invention is to provide a method for selecting an uplink transmission resource and a terminal, to resolve a problem of low utilization of PUSCH resources.

According to a first aspect, an embodiment of the present invention provides a method for selecting an uplink transmission resource, applied to a terminal, where the method includes:
selecting at least two PUSCH resources on M carriers for uplink transmission if at least one PUSCH resource has a highest priority among PUSCH resources on the M carriers and PUCCH resources on N carriers; where
each of the PUSCH resources on the M carriers collides with each PUCCH resources on the N carriers, the M carriers and the N carriers belong to a same cell group, M and N are natural numbers, M is greater than 1, and N is greater than or equal to 1.

According to a second aspect, an embodiment of the present invention further provides a terminal, including:
a selecting module, configured to: select at least two PUSCH resources on M carriers for uplink transmission if at least one of the PUSCH resources on the M carriers has a highest priority among PUSCH resources on the M carriers and PUCCH resources on N carriers; where
each of the PUSCH resources on the M carriers collides with each PUCCH resources on the N carriers, the M carriers and the N carriers belong to a same cell group, M and N are natural numbers, M is greater than 1, and N is greater than or equal to 1.

According to a third aspect, an embodiment of the present invention further provides a terminal, including a processor, a memory, and a program stored in the memory and capable of running on the processor, where when the program is executed by the processor, the steps of the method for selecting an uplink transmission resource according to the first aspect are implemented.

According to a fourth aspect, an embodiment of the present invention further provides a computer-readable storage medium, where the computer-readable storage medium stores a computer program, and when the computer program is executed by a processor, the steps of the foregoing method for selecting an uplink transmission resource are implemented.

In the embodiments of the present invention, PUSCH resources on a plurality of carriers collide with PUCCH resources on one or more carriers. If a PUSCH resource has a highest priority (for example, including that a highest priority of a PUSCH resource is equal to a highest priority of a PUCCH resource), the PUSCH resources on the plurality of carriers may be used for uplink transmission, which can effectively improve utilization of the PUSCH resources.

BRIEF DESCRIPTION OF DRAWINGS

Other advantages and benefits will become apparent to those of ordinary skill in the art by reading detailed description of the embodiments below. The accompanying drawings are merely intended to illustrate the objectives of the preferred embodiments and are not intended to limit the present invention. Throughout the accompanying drawings, the same reference numerals represent the same components. In the accompanying drawings.

DETAILED DESCRIPTION

Figure 1:
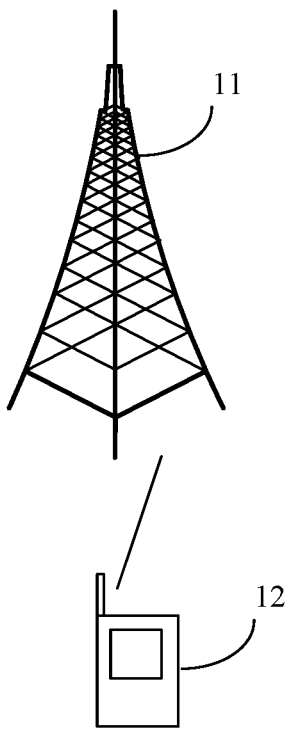
FIG. 1 is a schematic architectural diagram of a wireless communications system according to an embodiment of the present invention.

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Terms "include", "comprise" and any other variants thereof in the specification and claims of the application are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. In addition, the term "and/or" used in the specification and claims indicates at least one of connected objects. For example, A and/or B represents the following three cases: Only A exists, only B exists, and both A and B exist.

In the embodiments of the present invention, the word such as "an example" or "for example" is used to represent giving an example, an instance, or an illustration. Any embodiment or design solution described as "an example" or "for example" in the embodiments of the present invention shall not be interpreted to be more preferential or advantageous than other embodiments or design solutions. Specifically, terms such as "an example" or "for example" are used to present related concepts in a specific manner.

The technologies described herein are not limited to long term evolution (LTE)/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are often used interchangeably. The CDMA system can implement radio technologies such as CDMA2000 and universal terrestrial radio access (UTRA). UTRA includes wideband CDMA (WCDMA) and other CDMA variants. The TDMA system can implement radio technologies such as global system for mobile communications (GSM). The OFDMA system may implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are part of the universal mobile telecommunications system (UMTS). LTE and more advanced LTEs (such as LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described herein are applicable not only to the above-mentioned systems and radio technologies, but also to other systems and radio technologies.

The following describes the embodiments of the present invention with reference to the accompanying drawings. A method for selecting an uplink transmission resource and a terminal provided in the embodiments of the present invention may be applied to a wireless communications system. FIG. 1 is a schematic architectural diagram of a wireless communications system according to an embodiment of the present invention. As shown in FIG. 1, the wireless communications system may include a network device 11 and a terminal 12. The terminal 12 may be denoted as UE 12, and the terminal 12 may communicate (transmit signaling or transmit data) with the network device 11. In practical applications, connection between the above devices may be a wireless connection. For ease of visually representing the connection relationship between the devices, a solid line is used to indicate that in FIG. 1.

The network device 11 provided in this embodiment of the present invention may be a base station. The base station may be a commonly used base station or an evolved node base station (eNB), or may be a network device in a 5G system (for example, a next generation node base station (next generation node base station, gNB), a transmission and reception point (transmission and reception point, TRP)), or another device.

The terminal 12 provided in this embodiment of the present invention may be a mobile phone, a tablet computer, a notebook computer, an ultra-mobile personal computer (UMPC), a netbook, a personal digital assistant (PDA), a mobile internet device (MID), a wearable device, a vehicle-mounted device, or the like.

Figure 2:
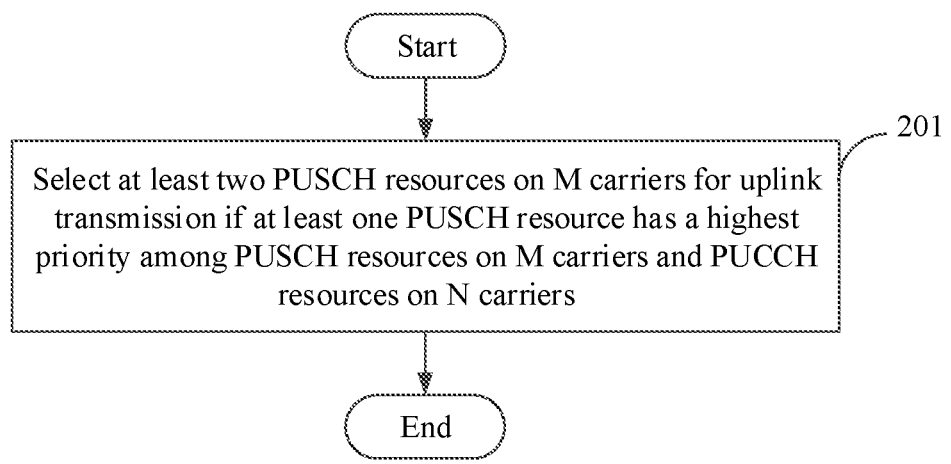
FIG. 2 is a flowchart of a method for selecting an uplink transmission resource according to an embodiment of the present invention.

Referring to FIG. 2, an embodiment of the present invention provides a method for selecting an uplink transmission resource, and the method may be executed by a terminal. The terminal is configured with carrier aggregation or dual connectivity. The terminal is allocated with PUSCH resources on M carriers and PUCCH resources on N carriers, where each of the PUSCH resources on the M carriers collides with each PUCCH resources on the N carriers, the M carriers and the N carriers belong to a same cell group, M and N are natural numbers, M is greater than 1, and N is greater than or equal to 1. The method includes step 201.

Step 201: Select at least two PUSCH resources on the M carriers for uplink transmission if at least one PUSCH resource has a highest priority among the PUSCH resources on the M carriers and the PUCCH resources on the N carriers.

For example, M is equal to 4, including carrier 1, carrier 2, carrier 3, and carrier 4.

If a PUSCH resource on carrier 1 has a highest priority, at least one PUSCH resource with the highest priority may be the PUSCH resource on carrier 1.

If PUSCH resources on carrier 1 and carrier 2 have a highest priority, at least one PUSCH resource with the highest priority may be the PUSCH resource on carrier 1 and the PUSCH resource on carrier 2.

If PUSCH resources on carrier 1, carrier 2, and carrier 3 have a highest priority, at least one PUSCH resource with the highest priority may be the PUSCH resource on carrier 1, the PUSCH resource on carrier 2, and the PUSCH resource on carrier 3.

In some embodiments, the above scenario in which at least one PUSCH resource has the highest priority may include: (1) at least one PUSCH resource has the highest priority, which is higher than priorities of the PUCCH resources and priorities of other PUSCH resources; (2) at least one PUSCH resource has the highest priority, and the priority of the PUSCH resource is equal to the highest priority of a PUCCH resource, that is, the highest priority of the PUSCH resource is equal to the highest priority of the PUCCH resource.

For example, UE is allocated with PUSCHs and PUCCHs respectively on a plurality of carriers.

Priorities of the resources are as follows: PUSCH@Cell1>PUCCH@Cell1>PUSCH@Cell2, where the PUSCH@Cell1 has the highest priority.

Alternatively, priorities of the resources are as follows: PUSCH@Cell1=PUCCH@Cell1>PUSCH@Cell2, where the PUSCH@Cell1 has the highest priority.

The physical uplink shared channel (PUSCH) in this specification may alternatively be referred to as an uplink shared channel (UL-SCH), and a PUSCH resource may alternatively be referred to as a UL-SCH resource.

In the embodiments of the present invention, a method for calculating the priority of the PUSCH resource is as follows.

Based on a logical channel prioritization procedure of medium access control (MAC), among all logical channels that can be mapped to the PUSCH resource for uplink transmission, a priority of a logical channel with to-be-transmitted data and with a highest priority (a network side configures a priority for each uplink logical channel (LCH) of the UE) is selected as the priority of the PUSCH resource.

PUSCH resources have some mapping restrictions, which means that only one subset of all LCHs of the UE may be mapped to the PUSCH resources because characteristics of the PUSCH resources match service characteristics transmitted by the LCH.

At a particular occasion, the UE may be allocated with an uplink resource by a network side, but at this occasion, the UE may have no data to be transmitted.

For example, for voice over IP (VOIP) transmission, a block of resources is allocated to the UE by the network side at 20 ms (millisecond), but the UE is silent at this occasion (for example, the other party is talking) and has no data to be transmitted. In a possible implementation, if there is no data transmission, the resource does not participate in priority comparison.

In the embodiments of the present invention, a method for calculating the priority of the PUCCH resource is as follows.

When the PUCCH carries a scheduling request (SR) signal, if a particular LCH triggers a buffer status report (BSR), and the BSR further triggers an SR, a priority of the LCH is used as a priority of the PUCCH resource. The priority of the LCH may be defined in a protocol or configured by the network side.

Alternatively, when the PUCCH carries the SR signal, if the SR is triggered by a medium access control control element (MAC CE), a priority of the MAC CE that has triggered the SR is used as the priority of the PUCCH resource, where the priority of the MAC CE is defined in the protocol or configured by the network side.

In this embodiment of the present invention, the priorities of the PUSCH resources and the PUCCH resources may be determined in an existing manner, where the priorities of the PUSCH resources and the PUCCH resources may be represented by numerical values or letters. For example, a priority of a PUSCH resource is 2 (higher), a priority of a PUCCH resource is 3 (lower), and the priority of the PUSCH resource is higher than the priority of the PUCCH resource.

In this embodiment of the present invention, the PUSCH resource with a highest priority and the PUCCH resource with a highest priority have a same priority. For example, a priority of the PUSCH resource is 1 (the highest priority), and a priority of the PUCCH resource is 1 (the highest priority).

It can be understood that, in this embodiment of the present invention, priority representation of the PUSCH resources and the PUCCH resources is not limited.

In this embodiment of the present invention, step 201 may be implemented through the following manners.

Manner 1: Select at least two PUSCH resources on the M carriers for uplink transmission if a priority of a first PUSCH resource is higher than or equal to the priorities of the PUCCH resources on the N carriers; otherwise, select at least one PUCCH resource on the N carriers for uplink transmission.

The first PUSCH resource is a PUSCH resource with a highest priority in the PUSCH resources on the plurality of carriers, and each PUSCH resource on the M carriers collides (that is, completely or partially overlaps in time) with the PUCCH resources on the N carriers, where N=1.

In Manner 1, when the PUSCH resources collide with the PUCCH resources, if a PUSCH resource has a higher priority, at least two PUSCH resources on the plurality of carriers can be used for uplink transmission, which improves utilization of the PUSCH resources and prevents a PUSCH from being blocked by a signal carried by a PUCCH.

For example, the PUSCH resources on the plurality of carriers include: a PUSCH1 resource and a PUSCH2 resource. If the PUSCH1 resource and the PUCCH1 resource partially overlap, a priority of the PUSCH1 resource is lower than a priority of the PUCCH1 resource, but a priority of the PUSCH2 resource is higher than or equal to the priority of the PUCCH1 resource, the PUSCH1 resource and the PUSCH2 resource are selected for uplink transmission. In this way, when the PUSCH resources collide with the PUCCH resources, a PUSCH resource with a higher priority can be selected for uplink transmission, and the PUSCH1 resource and the PUSCH2 resource are selected for uplink transmission, which improves utilization of the PUSCH resources and prevents a PUSCH from being blocked by a signal carried by a PUCCH.

Manner 2: Select at least two PUSCH resources on the M carriers for uplink transmission if a priority of a first PUSCH resource is higher than or equal to a priority of a first PUCCH resource; otherwise, select at least one PUCCH resource on the N carriers for uplink transmission.

The first PUSCH resource is a PUSCH resource with a highest priority in the PUSCH resources on the M carriers, the first PUCCH resource is a PUCCH resource with a highest priority in the PUCCH resources on the N carriers, and each PUSCH resource on the M carriers collides (that is, completely or partially overlaps in time) with the PUCCH resources on the N carriers, where N is greater than 1.

For example, the UE compares priorities of PUSCH resources on different carriers and determines a PUSCH resource with a highest priority; and the UE compares priorities of PUCCH resources on different carriers and determines a PUCCH resource with a highest priority. The priorities of the determined PUSCH resource and PUCCH resource are compared. If the priority of the PUSCH resource is higher than or equal to the priority of the PUCCH resource, the UE may perform uplink transmission on the PUSCH resources on the plurality of carriers, which improves utilization of the PUSCH resources and prevents a PUSCH from being blocked by a signal carried by a PUCCH.

Manner 3: Select at least two PUSCH resources on the M carriers for uplink transmission if a priority of at least one PUSCH resource on the M carriers is higher than or equal to the priorities of the PUCCH resources on the N carriers; otherwise, select at least one PUCCH resource on the N carriers for uplink transmission.

Each PUSCH resource on the M carriers collides (that is, completely or partially overlaps in time) with the PUCCH resources on the N carriers, where N is equal to 1.

Manner 4: Select at least two PUSCH resources on the M carriers for uplink transmission if a priority of at least one PUSCH resource on the M carriers is higher than or equal to the priorities of the PUCCH resources on the N carriers; otherwise, select at least one PUCCH resource on the N carriers for uplink transmission.

Each PUSCH resource on the M carriers collides (that is, completely or partially overlaps in time) with the PUCCH resources on the N carriers, where N is greater than 1.

In Manner 1, Manner 2, Manner 3, and Manner 4, selecting at least one PUCCH resource on the N carriers for uplink transmission includes any one of the following:

(1) selecting a PUCCH resource on one carrier for uplink transmission;

(2) selecting PUCCH resources on the N carriers for uplink transmission, which can improve utilization of the PUCCH resources;

(3) selecting a PUCCH resource with the highest priority from the PUCCH resources on the N carriers for uplink transmission, which can ensure effective transmission of high-priority traffic; and (4) selecting one PUCCH resource from the PUCCH resources on O carriers of the N carriers for uplink transmission, where priorities of the PUCCH resources on the O carriers are all higher than the priorities of the PUSCH resources, O is greater than or equal to 1, and O is less than or equal to N, which can ensure effective transmission of high-priority traffic.

In this embodiment of the present invention, if the terminal finally determines to select a PUCCH resource for transmission, and there are PUCCH resources on a plurality of carriers available for selection, the UE may select one PUCCH resource from all PUCCH resources with priorities higher than the priorities of the PUSCH resources, for uplink transmission.

For example, the UE has two PUCCH resources available for selection, one PUCCH resource has a higher priority than the PUSCH resource that partially overlaps in time, and the other PUCCH resource has a lower priority than the PUSCH resource that partially overlaps in time. The UE selects the PUCCH resource with the priority higher than the priority of the PUSCH resource for uplink transmission, which can ensure effective transmission of high-priority traffic.

If a priority of any PUCCH resource is higher than the priority of the PUSCH resource, the UE can randomly select one PUCCH resource for uplink transmission. For example, the UE selects a PUCCH resource with a relatively low priority (in comparison of the two PUCCH resources) for uplink transmission.

In Manner 1, Manner 2, Manner 3, and Manner 4, the selecting at least two PUSCH resources on the M carriers for uplink transmission includes:

using the PUSCH resources on the M carriers for uplink transmission, where no more than one PUSCH resource is usable on each carrier; selecting at least two PUSCH resources from the PUSCH resources on the M carriers for uplink transmission, where the at least two PUSCH resources are mapped with data to be transmitted; or selecting at least one PUSCH resource having a lower priority than the PUCCH resource from the PUSCH resources on the M carriers, for data transmission, which can improve utilization of the PUSCH resources.

In some implementations, the method shown in FIG. 2 further includes:

skipping performing, by the terminal, uplink transmission on PUSCH resources that collide with the PUCCH resources on the N carriers, which means that if the UE selects a PUCCH resource for uplink transmission, the UE cannot perform uplink transmission on any PUSCH resource that collides with the PUCCH resource, which can ensure effective transmission of a signal carried by a PUCCH; or selecting, by the terminal, no PUSCH resource on a first carrier for uplink transmission if the terminal selects a PUCCH resource on the first carrier for uplink transmission, which means that if the UE selects a PUCCH resource for uplink transmission, the UE cannot perform uplink transmission on a PUSCH resource on the same carrier as the PUCCH resource, which can ensure the transmission on the PUCCH resource on the first carrier; or selecting, by the terminal, a PUSCH resource on a carrier other than a first carrier for uplink transmission if the terminal selects a PUCCH resource on the first carrier for uplink transmission, which means that if the UE selects a PUCCH resource for uplink transmission, the UE cannot perform uplink transmission on a PUSCH resource on the same carrier as the PUCCH resource, and the terminal supports the UE to select colliding PUSCH resources and PUCCH resources on different carriers for uplink transmission, which can improve utilization of the resources.

It can be understood that the carrier in this specification may also be replaced with a component carrier (CC) or a cell, which means one component carrier may refer to a primary cell (PCell), a primary secondary cell (PSCell), or a secondary cell (SCell) in the carrier aggregation or dual connectivity technology. In the carrier aggregation or dual connectivity technology, a plurality of serving cells managed by a same network device (for example, an eNB or a gNB) belong to a same cell group.

For example, for a plurality of cells belonging to a cell group, if the UE is allocated with PUSCH resources and PUCCH resources respectively, the PUSCH resources and PUCCH resources completely or partially overlap in time. The UE selects one PUCCH resource for uplink transmission if a PUCCH resource has a highest priority among all PUSCH resources and PUCCH resources; otherwise, the UE selects one PUSCH resource for uplink transmission.

In this embodiment of the present invention, when the PUSCH resources collide with the PUCCH resources, if a PUSCH resource has the highest priority (for example, including that a highest priority of a PUSCH resource is equal to a highest priority of a PUCCH resource), the PUSCH resources on the plurality of carriers may be used for uplink transmission, which improves utilization of the resources and prevents a PUSCH from being blocked by a signal carried by a PUCCH.

The following describes the method for selecting an uplink transmission resource shown in FIG. 2 with reference to specific examples.

Example 1: PUSCH resources on a plurality of component carriers collide with a PUCCH resource on one component carrier.

For UE configured with carrier aggregation, a cell group includes two serving cells, such as PCell and SCell.

At time T, the UE has a PUCCH resource and a PUSCH resource (that is, PUSCH@PCell) on the PCell and a PUSCH resource on the SCell (that is, PUSCH@SCell), which means that the PUCCH collides with PUSCH@PCell resources and with PUSCH@SCell resources.

The UE determines priorities of the PUSCH@PCell and PUSCH@SCell resources separately.

A method for determining a priority of a resource is as follows: determining, among logical channels with to-be-transmitted data, a set of logical channels that can be mapped to corresponding resources for uplink transmission, and determining a priority corresponding to a logical channel with a highest priority in the set as the priority of the PUSCH resource.

For example, it is assumed that the priority of the PUSCH@PCell is a; and the priority of the PUSCH@SCell is b.

The UE determines priorities of the PUCCH resources separately.

A method for determining is as follows: if an SR to be transmitted can be mapped to the PUCCH resource, using a priority of a logical channel that has triggered the SR to be transmitted as the priority of the PUCCH resource.

For example, it is assumed that the priority of the PUCCH is c.

Priorities of all colliding PUSCH resources and PUCCH resources are compared. If a highest priority corresponding to a PUCCH resource is higher than or equal to a highest priority corresponding to the PUSCH resources, a PUCCH resource is selected for uplink transmission, and all PUSCH resources are not used for uplink transmission; otherwise, all PUSCH resources in the cell group can be used for uplink transmission (if on a cell, the UE has a plurality of PUSCH resources that partially overlap in time, the UE selects one PUSCH resource for uplink transmission), and no PUCCH resource is selected for uplink transmission.

Example 2: PUSCH resources on a plurality of carriers collide with PUCCH resources on a plurality of carriers.

For UE configured with carrier aggregation, a cell group includes two serving cells, such as PCell and SCell.

At time T, the UE has a PUCCH resource and a PUSCH resource (that is, PUSCH@PCell) on the PCell and a PUCCH resource and a PUSCH resource (that is, PUSCH@SCell) on the S Cell, which means that the PUCCH@PCell and PUCCH@SCell resources collide with the PUSCH@PCell and PUSCH@SCell resources.

The UE determines priorities of the PUSCH@PCell and PUSCH@SCell resources separately.

A method for determining is as follows: determining, among logical channels with to-be-transmitted data, a set of logical channels that can be mapped to corresponding resources for uplink transmission, and determining a priority corresponding to a logical channel with a highest priority in the set as the priority of the PUSCH resource.

For example, it is assumed that the priority of the PUSCH@PCell is a; and the priority of the PUSCH@SCell is b.

The UE determines priorities of the PUCCH resources separately.

A method for determining is as follows: if an SR to be transmitted can be mapped to the PUCCH resource, using a priority of a logical channel that has triggered the SR to be transmitted as the priority of the PUCCH resource. It is assumed that a priority of the PUCCH@PCell is c; and a priority of the PUCCH@SCell is d.

Priorities of all colliding PUSCH resources and PUCCH resources are compared. If a highest priority corresponding to the PUCCH resources is higher than or equal to a highest priority corresponding to the PUSCH resources, a PUCCH resource is selected for uplink transmission, and all PUSCH resources are not used for uplink transmission; otherwise, PUSCH resources on all component carriers of the cell group can be used for uplink transmission, and no PUCCH resource is used for uplink transmission.

If a PUCCH resource is selected for uplink transmission based on a determined comparison result, any one of the following may be performed:
(1) The UE selects one PUCCH resource for uplink transmission;
(2) The UE selects a plurality PUCCH resource on different carriers for uplink transmission;
(3) The UE selects a PUCCH resource with a highest priority for uplink transmission; and
(4) The UE selects one PUCCH resource from all PUCCH resources with priorities higher than priorities of the PUSCH resources for uplink transmission.

Figure 3:
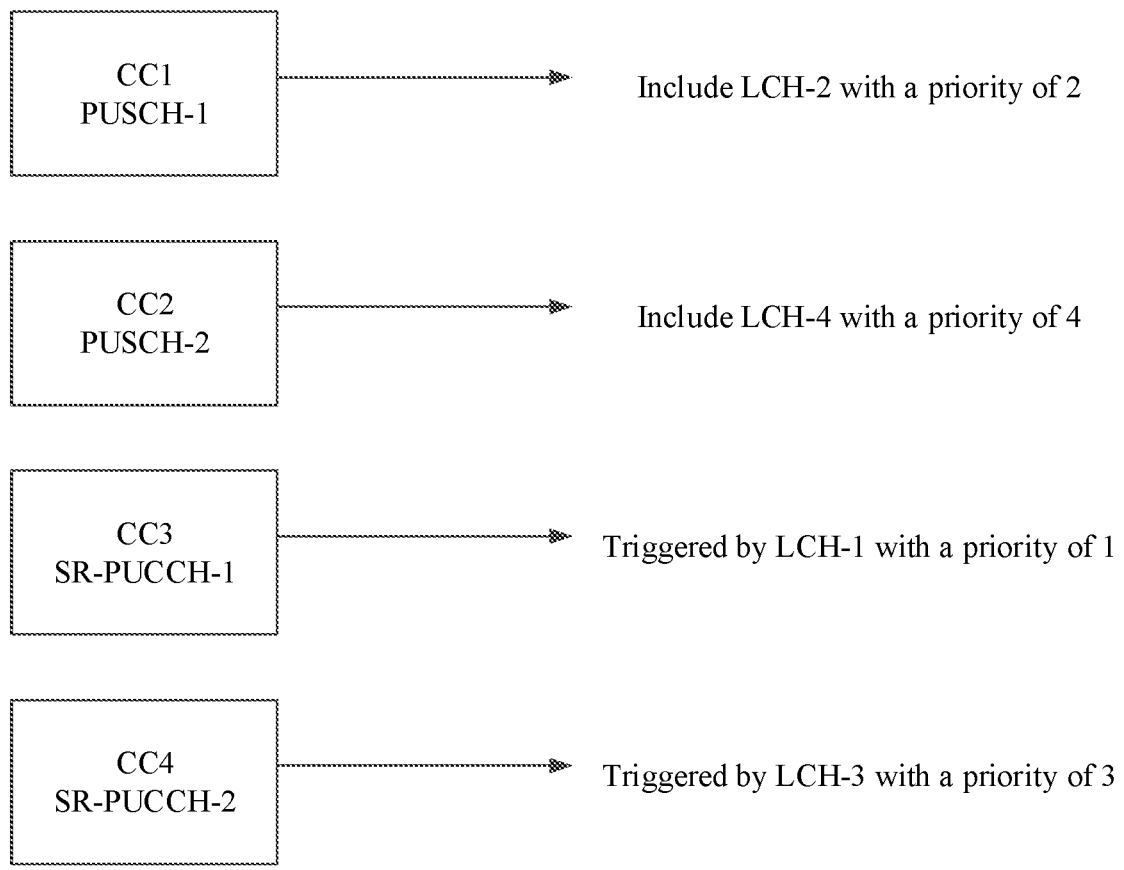
FIG. 3 is a schematic configuration diagram of PUSCH resources and PUCCH resources according to an embodiment of the present invention.

FIG. 3 shows a possible configuration. Component carrier 1 is configured with a PUSCH-1 resource with a priority of 2; component carrier 2 is configured with a PUSCH-2 resource with a priority of 4; component carrier 3 is configured with an SR-PUCCH-1 resource with a priority of 1; and component carrier 4 is configured with an SR-PUCCH-2 resource with a priority of 3. For example, if a smaller value represents a higher priority, a descending order of the priorities is as follows: the SR-PUCCH-1 resource, the PUSCH-1 resource, the SR-PUCCH-2 resource, and the PUSCH-2 resource.

Example 3: PUSCH resources on a plurality of carriers collide with a PUCCH resource on one carrier.

On a colliding carrier, a PUSCH resource or a PUCCH resource is selected for uplink transmission according to a priority of the PUSCH resource and a priority of the PUCCH resource.

The colliding carrier is a carrier configured with both a PUSCH resource and a PUCCH resource.

On a non-colliding carrier, the UE may select a PUCCH resource and a PUSCH resource for uplink transmission.

A non-colliding carrier is a carrier only configured with a PUSCH resource or a PUCCH resource.

In Example 1 to Example 3, when the PUSCH resources collides with the PUCCH resources, if a PUSCH resource has a highest priority (for example, including that a highest priority of a PUSCH resource is equal to a highest priority of a PUCCH resource), the PUSCH resources on the plurality of carriers may be used for uplink transmission, which improves utilization of the PUSCH resources and prevents a PUSCH from being blocked by a signal carried by a PUCCH; and if a PUCCH resource has a higher priority, the PUCCH resource may be selected for uplink transmission, which can ensure effective transmission of high-priority traffic.

Figure 4:
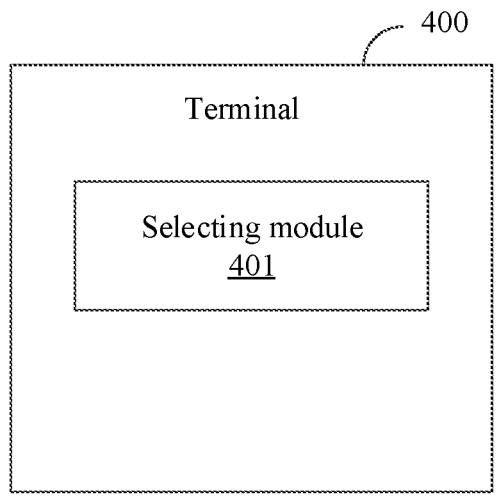
FIG. 4 is a first schematic diagram of a terminal according to an embodiment of the present invention.

Referring to FIG. 4, an embodiment of the present invention further provides a terminal. The terminal is configured with carrier aggregation or dual connectivity. The terminal is allocated with PUSCH resources on M carriers and PUCCH resources on N carriers, where each of the PUSCH resources on the M carriers collides with each PUCCH resources on the N carriers, the M carriers and the N carriers belong to a same cell group, M and N are natural numbers, M is greater than 1, and N is greater than or equal to 1. The terminal 400 includes:
 a selecting module 401, configured to select at least two PUSCH resources on the M carriers for uplink transmission if at least one PUSCH resource has a highest priority among the PUSCH resources on the M carriers and the PUCCH resources on the N carriers (for example, including that a highest priority of the PUSCH resources is equal to a highest priority of the PUCCH resources).

In some implementations, the selecting module 401 is further configured to: select at least two PUSCH resources of the PUSCH resources on the M carriers for uplink transmission if a priority of a first PUSCH resource is higher than or equal to the priorities of the PUCCH resources on the N carriers; otherwise, select at least one PUCCH resource on the N carriers for uplink transmission.

The first PUSCH resource is a PUSCH resource with a highest priority in the PUSCH resources on the M carriers, where N=1.

In some implementations, the selecting module 401 is further configured to: select at least two PUSCH resources on the M carriers for uplink transmission if a priority of a first PUSCH resource is higher than or equal to a priority of a first PUCCH resource; otherwise, select at least one PUCCH resource on the N carriers for uplink transmission, where the first PUSCH resource is a PUSCH resource with a highest priority in the PUSCH resources on the M carriers, the first PUCCH resource is a PUCCH resource with a highest priority in the PUCCH resources on the N carriers, and N is greater than 1.

In some implementations, the selecting module 401 is further configured to: select at least two PUSCH resources on M carriers for uplink transmission if a priority of at least one PUSCH resource on the M carriers is higher than or equal to priorities of PUCCH resources on N carriers; otherwise, select at least one PUCCH resource on the N carriers for uplink transmission; where N=1.

In some implementations, the selecting module 401 is further configured to: select at least two PUSCH resources on M carriers for uplink transmission if a priority of at least one PUSCH resource on the M carriers is higher than or equal to priorities of PUCCH resources on N carriers; otherwise, select at least one PUCCH resource on the N carriers for uplink transmission; where N is greater than 1.

In some implementations, the selecting module 401 is further configured to: skip performing, by the terminal, uplink transmission on PUSCH resources that collide with the PUCCH resources on the N carriers; select, by the terminal, no PUSCH resource on a first carrier for uplink transmission if the terminal selects a PUCCH resource on the first carrier for uplink transmission; or select, by the terminal, a PUSCH resource on a carrier other than a first carrier for uplink transmission.

In some implementations, the selecting at least one PUCCH resource on the N carriers for uplink transmission includes any one of the following:
(1) selecting a PUCCH resource on one carrier for uplink transmission;
(2) selecting PUCCH resources on a plurality of carriers for uplink transmission;
(3) selecting a PUCCH resource with the highest priority from the PUCCH resources on the N carriers for uplink transmission; and
(4) selecting one PUCCH resource from PUCCH resources on O carriers of the N carriers for uplink transmission, where priorities of the PUCCH resources on the O carriers are all higher than the priorities of the PUSCH resources, O is greater than or equal to 1, and O is less than or equal to N.

In some implementations, the selecting at least two PUSCH resources on the M carriers for uplink transmission includes:
using the PUSCH resources on the M carriers for uplink transmission, where no more than one PUSCH resource is usable on each carrier; selecting at least two PUSCH resources from the PUSCH resources on the M carriers for uplink transmission, where the at least two PUSCH resources are mapped with data to be transmitted; or selecting at least one PUSCH resource having a lower priority than the PUCCH resource from the PUSCH resources on the M carriers, for data transmission.

In the embodiments of the present invention, the PUCCH resource is used to carry an SR, and the priority of the PUCCH resource is determined according to a priority of a MAC CE that has triggered the SR, where the priority of the MAC CE is defined in a protocol or configured by a network side.

The terminal provided in this embodiment of the present invention may execute the foregoing method embodiment shown in FIG. 2, implementation principles and technical effects thereof are similar, and details are not described herein again.

Figure 5:
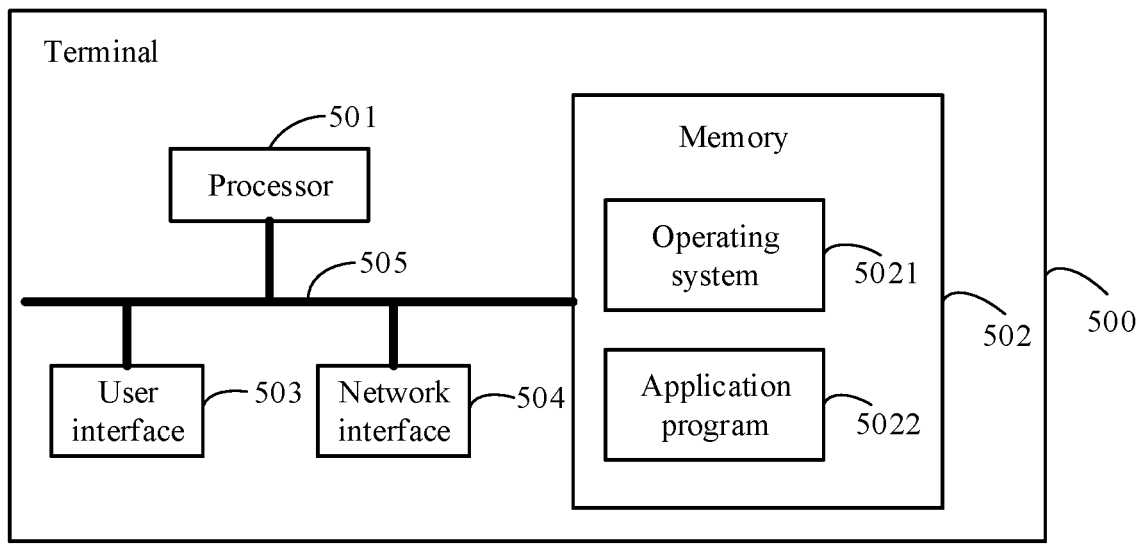
FIG. 5 is a second schematic diagram of a terminal according to an embodiment of the present invention.

As shown in FIG. 5, a terminal 500 shown in FIG. 5 includes at least one processor 501, a memory 502, at least one network interface 504, and a user interface 503. Components of the terminal 500 are coupled together by using a bus system 505. It can be understood that the bus system 505 is configured to implement connection and communication between these components. In addition to a data bus, the bus system 505 further includes a power bus, a control bus, and a status signal bus. However, for clarity of description, various buses are marked as the bus system 505 in FIG. 5.

The user interface 503 may include a display, a keyboard, a pointing device (for example, a mouse or a trackball (trackball)), a touch panel, or a touchscreen.

It can be understood that the memory 502 in this embodiment of the present invention may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example but not restrictive description, many forms of RAM may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DRRAM). The memory 502 in a system and method described in this embodiment of the present invention is intended to include but is not limited to these and any other suitable types of memories.

In some embodiments, the memory 502 stores the following elements: executable modules or data structures, or a subset thereof, or an extended set thereof: an operating system 5021 and an application program 5022.

The operating system 5021 includes various system programs, such as a framework layer, a core library layer, and a driver layer, for implementing various basic services and processing hardware-based tasks. The application program 5022 includes various application programs, such as a media player and a browser, which are used to implement various application services. A program for implementing the method in this embodiment of the present invention may be included in the application program 5022.

In an embodiment of the present invention, a program or an instruction stored in the memory 502, which may be specifically a program or an instruction stored in the application program 5022, is invoked, and the foregoing step shown in FIG. 2 is implemented during execution.

The terminal provided in this embodiment of the present invention may execute the foregoing method embodiment shown in FIG. 2, implementation principles and technical effects thereof are similar, and details are not described herein again.

Method or algorithm steps described with reference to the content disclosed in the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (Erasable PROM, EPROM), an electrically erasable programmable read-only memory (Electrically EPROM, EEPROM), a register, a hard disk, a removable hard disk, a compact disc read-only memory, or any other form of storage medium well-known in the art. An example storage medium is coupled to a processor, so that the processor can read information from the storage medium or write information into the storage medium. Certainly, the storage medium may alternatively be a component of the processor. The processor and the storage medium may be located in an application-specific integrated circuit (ASIC). In addition, the ASIC may be located in a core network interface device. Certainly, the processor and the storage medium may alternatively exist in the core network interface device as discrete components.

A person skilled in the art should be aware that, in the foregoing one or more examples, functions described in the present invention may be implemented by hardware, software, firmware, or any combination thereof. When the functions are implemented by software, the functions may be stored in a computer-readable medium or as one or more instructions or code in the computer-readable medium, for uplink transmission. The computer-readable medium includes a computer storage medium and a communications medium, where the communications medium includes any medium that enables a computer program to be transmitted from one place to another. The storage medium may be any available medium capable of being accessed by a general-purpose or dedicated computer.

The objectives, technical solutions, and beneficial effects of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

A person skilled in the art should understand that the embodiments of the present invention may be provided as a method, a system, or a computer program product. Therefore, the embodiments of the present invention may use a form of hardware only embodiments, software only embodiments, or embodiments with a combination of software and hardware. Moreover, the embodiments of the present invention may use a form of a computer program product that is implemented on one or more computer-usable storage media (including but not limited to a disk memory, a CD-ROM, an optical memory, and the like) that include computer-usable program code.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of the present invention without departing from the spirit and scope of the present invention. The present invention is intended to cover these modifications and variations provided that they fall within the scope of protection defined by the following claims and their equivalent technologies.

What is claimed is:

1. A method for selecting an uplink transmission resource, applied to a terminal and comprising:
   using physical uplink shared channel (PUSCH) resources on M carriers for uplink transmission when a priority of a first PUSCH resource on the M carriers is higher than priorities of physical uplink control channel (PUCCH) resources on N carriers; wherein no more than one PUSCH resource is available on each of the M carriers;
   wherein the using PUSCH resources on M carriers for uplink transmission comprises:
   using the first PUSCH resource and a second PUSCH resource for uplink transmission; wherein the second PUSCH resource is a PUSCH resource with a lower priority than the priorities of the PUCCH resources on the N carriers;
   wherein the PUSCH resources on the M carriers collide with the PUCCH resources on the N carriers, the M carriers and the N carriers belong to a same cell group, M is equal to 2, and N is equal to 1.

2. The method according to claim 1, wherein the method further comprises:
   using the PUCCH resources on the N carriers for uplink transmission when priorities of all PUSCH resources on the M carriers are lower than the priorities of the PUCCH resources on the N carriers.

3. The method according to claim 1, wherein, that the PUSCH resources on the M carriers collide with the PUCCH resources on the N carriers, comprises:
that each of the PUSCH resources on the M carriers collides with the PUCCH resources on the N carriers.

4. The method according to claim 3, wherein, that the each of the PUSCH resources on the M carriers collides with the PUCCH resources on the N carriers, comprises:
a duration of each of the PUSCH resource on the M carriers overlaps with a duration of the PUCCH resources on the N carriers.

5. The method according to claim 1, wherein the PUCCH resource is used to carry a scheduling request (SR), a priority of the PUCCH resource is determined according to a priority of logical channel (LCH) that triggers buffer status report (BSR), and the BSR is used to trigger the SR; the priority of the LCH is defined in a protocol or configured by network side.

6. A terminal, comprising: a processor, a memory, and a program stored in the memory and ran on the processor, wherein when the program is executed by the processor, the steps of the method for selecting an uplink transmission resource are implemented, wherein the method comprises:
using physical uplink shared channel (PUSCH) resources on M carriers for uplink transmission when a priority of a first PUSCH resource on the M carriers is higher than priorities of physical uplink control channel (PUCCH) resources on N carriers; wherein no more than one PUSCH resource is available on each of the M carriers;
wherein the using PUSCH resources on M carriers for uplink transmission comprises:
using the first PUSCH resource and a second PUSCH resource for uplink transmission; wherein the second PUSCH resource is a PUSCH resource with a lower priority than the priorities of the PUCCH resources on the N carriers;
wherein the PUSCH resources on the M carriers collides with the PUCCH resources on the N carriers, the M carriers and the N carriers belong to a same cell group, M is equal to 2, and N is equal to 1.

7. The terminal according to claim 6, wherein the method further comprises:
using the PUCCH resources on the N carriers for uplink transmission when priorities of all PUSCH resources on the M carriers are lower than the priorities of the PUCCH resources on the N carriers.

8. The terminal according to claim 6, wherein, that the PUSCH resources on the M carriers collide with the PUCCH resources on the N carriers, comprises:
that each of the PUSCH resources on the M carriers collides with the PUCCH resources on the N carriers.

9. The terminal according to claim 8, wherein, that the each of the PUSCH resources on the M carriers collides with the PUCCH resources on the N carriers, comprises:
a duration of each of the PUSCH resource on the M carriers overlaps with a duration of the PUCCH resources on the N carriers.

10. The terminal according to claim 6, wherein the PUCCH resource is used to carry a scheduling request (SR), a priority of the PUCCH resource is determined according to a priority of logical channel (LCH) that triggers buffer status report (BSR), and the BSR is used to trigger the SR; the priority of the LCH is defined in a protocol or configured by network side.

11. A non-transitory computer-readable storage medium storing a computer program thereon, wherein when the computer program is executed by a processor, the steps of the method for selecting an uplink transmission resource are implemented, wherein the method comprises:
using physical uplink shared channel (PUSCH) resources on M carriers for uplink transmission when a priority of a first PUSCH resource on the M carriers is higher than or equal to priorities of physical uplink control channel (PUCCH) resources on N carriers; wherein no more than one PUSCH resource is available on each of the M carriers;
wherein the using PUSCH resources on M carriers for uplink transmission comprises:
using the first PUSCH resource and a second PUSCH resource for uplink transmission; wherein the second PUSCH resource is a PUSCH resource with a lower priority than the priorities of the PUCCH resources on the N carriers;
wherein the PUSCH resources on the M carriers collides with the PUCCH resources on the N carriers, the M carriers and the N carriers belong to a same cell group, M is equal to 2, and N is equal to 1.

12. The non-transitory computer-readable storage medium according to claim 11, wherein the method further comprises:
using the PUCCH resources on the N carriers for uplink transmission when priorities of all PUSCH resources on the M carriers are lower than the priorities of the PUCCH resources on the N carriers.

13. The non-transitory computer-readable storage medium according to claim 11, wherein, that the PUSCH resources on the M carriers collide with the PUCCH resources on the N carriers, comprises:
that each of the PUSCH resources on the M carriers collides with the PUCCH resources on the N carriers.

14. The non-transitory computer-readable storage medium according to claim 13, wherein, that the each of the PUSCH resources on the M carriers collides with the PUCCH resources on the N carriers, comprises:
a duration of each of the PUSCH resource on the M carriers overlaps with a duration of the PUCCH resources on the N carriers.

15. The non-transitory computer-readable storage medium according to claim 11, wherein the PUCCH resource is used to carry a scheduling request (SR), a priority of the PUCCH resource is determined according to a priority of logical channel (LCH) that triggers buffer status report (BSR), and the BSR is used to trigger the SR; the priority of the LCH is defined in a protocol or configured by network side.

* * * * *